United States Patent
Yang et al.

(10) Patent No.: US 11,034,192 B2
(45) Date of Patent: Jun. 15, 2021

(54) TIRE

(71) Applicant: KENDA RUBBER IND. CO., LTD., Yuanlin Township (TW)

(72) Inventors: Ying-Ming Yang, Yuanlin Township (TW); Wen-Fu Chiu, Yuanlin Township (TW)

(73) Assignee: KENDA RUBBER IND. CO., LTD., Yuanlin Township (TW)

( * ) Notice: Subject to any disclaimer, the term of this patent is extended or adjusted under 35 U.S.C. 154(b) by 254 days.

(21) Appl. No.: 15/284,275

(22) Filed: Oct. 3, 2016

(65) Prior Publication Data
US 2018/0093536 A1 Apr. 5, 2018

(51) Int. Cl.
*B60C 11/11* (2006.01)
*B60C 11/13* (2006.01)
*B60C 11/03* (2006.01)

(52) U.S. Cl.
CPC ...... *B60C 11/1392* (2013.01); *B60C 11/0306* (2013.01); *B60C 11/11* (2013.01); *B60C 11/1376* (2013.01); *B60C 2011/0341* (2013.01)

(58) Field of Classification Search
CPC ............. B60C 11/1376; B60C 11/1392; B60C 11/0083
See application file for complete search history.

(56) References Cited

U.S. PATENT DOCUMENTS 4,722,378 A * 2/1988 Carolla ............... B60C 11/0302
152/209.15
2011/0061780 A1 3/2011 Mita 2013/0092301 A1* 4/2013 Ebiko ................ B60C 11/0083
152/209.15
2013/0240101 A1 9/2013 Kameda
2014/0283965 A1 9/2014 Takahashi
2016/0280011 A1 9/2016 Uchida
2016/0280012 A1 9/2016 Uchida

FOREIGN PATENT DOCUMENTS

EP       2067636 A1    6/2009
EP       2960079 A1   12/2015
JP     2012116410 A    6/2012
(Continued)

OTHER PUBLICATIONS

English machine translation of JP2013193512. (Year: 2013).*
(Continued)

*Primary Examiner* — Robert C Dye
(74) *Attorney, Agent, or Firm* — Tracy M Heims; Apex Juris, Pllc.

(57) ABSTRACT

A tire is disclosed, including a plurality of blocks, each has an outer surface bulging outward and two lateral walls. An extension line is defined on the surface of each flat segment of each block. Each extension line has a first point on the flat segment. A first horizontal reference line is defined by connecting two first points. A second horizontal reference line is defined on the outer surface with two ends thereof contacting the outer surface. The second horizontal reference line is 0.85 times as long as the first horizontal reference line. A vertical distance between the outer surface and the second horizontal reference line is 0.2-0.8 mm. Whereby, the tire could provide good drainage performance and adequate grip.

4 Claims, 6 Drawing Sheets

(56) References Cited

FOREIGN PATENT DOCUMENTS

JP      2013193512      *   9/2013
WO      2015064248  A1      5/2015

OTHER PUBLICATIONS

English Abstract for EP2067636, Total of 1 page.
English Abstract for JP2012116410, Total of 1 page.
English Abstract for WO2015064248, Total of 1 page.
Communication pursuant to Article 94(3) EPC for EP Application No. 16192306.5-1012, dated Oct. 25, 2018, Total of 7 pages.
European Search report for Application No. 16192306.5-1760, dated Mar. 16, 2017, Total of 8 pages.

* cited by examiner

TIRE

BACKGROUND OF THE INVENTION

1. Technical Field

The present invention relates to a tire, and more particularly to a tire having good drainage performance.

2. Description of Related Art

Figure 1:
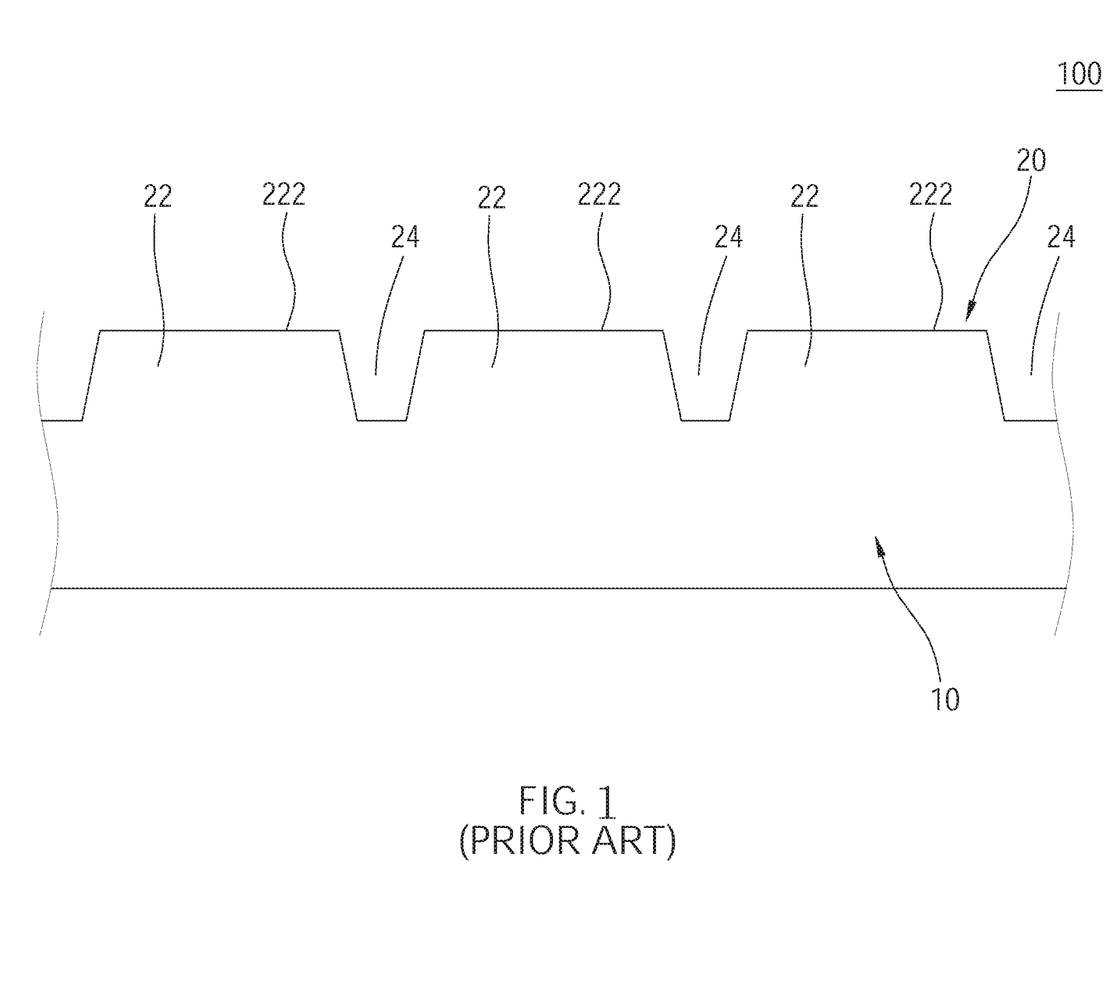
FIG. 1 is a schematic diagram, showing part of a conventional tire.

Part of a conventional tire 100 is illustrated in FIG. 1, including a body 10 and a tread 20 engaged with an outer side of the body 10. The tread 20 has a plurality of blocks 22 thereon, wherein the blocks 22 are provided along an outer circumferential surface of the tire 100 to form multiple parallel circles of blocks, each of which has two grooves 24 formed on two lateral sides thereof. Each block 22 has an outer surface 222 adapted to contact the road surface. The outer surface 222 is flat in a transverse direction (i.e., the width direction) of the tire 100. When the tire 100 is rolling on the ground, the outer surface 222 would abut against the ground. When the tire 100 is rolling on a wet ground, the water on the ground would be squeezed into the grooves 24 by the outer surfaces 222 of the blocks 22, whereby to maintain a certain grip.

Figure 2:
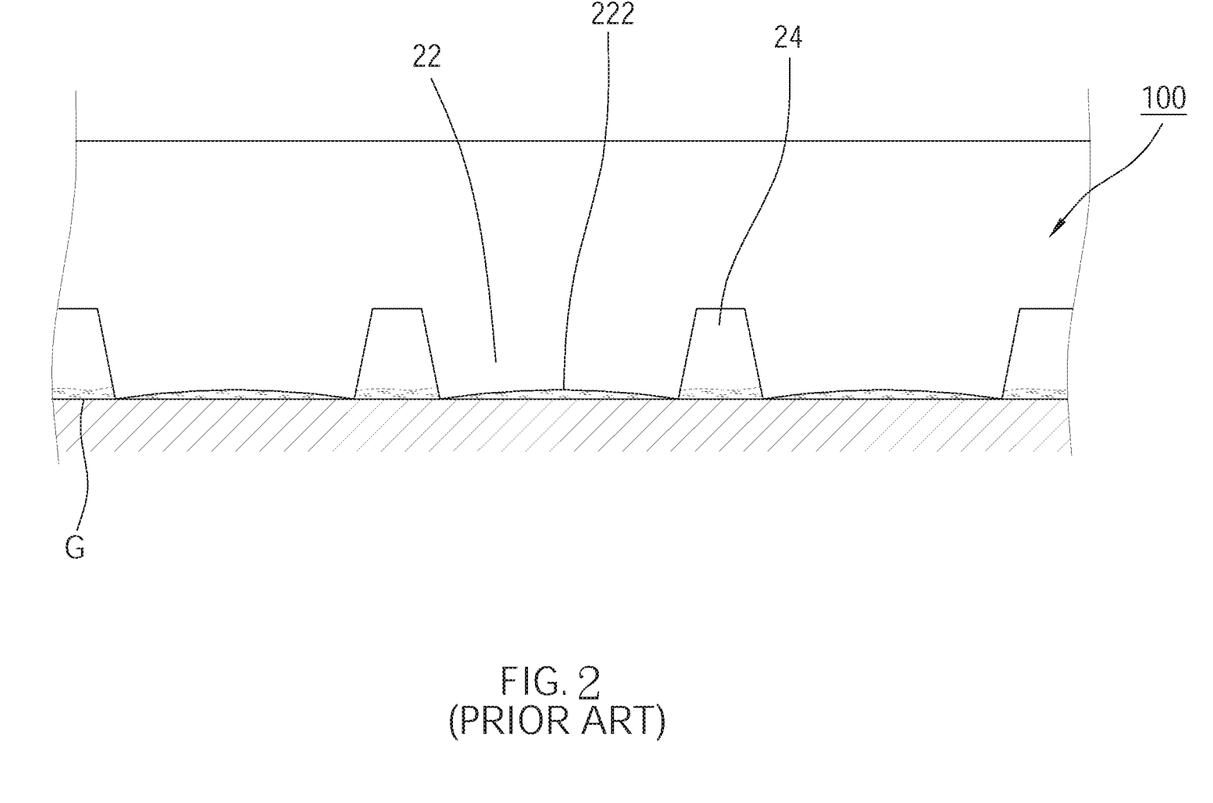
FIG. 2 is a schematic diagram, showing the situation when a worn conventional tire rolls on the wet ground.

However, the outer surfaces 222 of the blocks 22 of the tire 100 would gradually become worn with age, causing the outer surfaces 222 to recess inward (as shown in FIG. 2). Once recessed, the contact area between the outer surfaces 222 of the blocks 22 and the ground would be reduced, making the grip of the tire 100 worse. In addition, when the worn tire 100 rolls on the wet ground, the water could not be smoothly squeezed into the grooves 24 and dissipated; instead, the water would be confined in the recessed portions on the outer surfaces 222, causing hydroplaning. In all aspects, such a conventional tire still has room for improvements.

BRIEF SUMMARY OF THE INVENTION

In view of the above, the primary objective of the present invention is to provide a tire, which provides good drainage performance and long service life.

To achieve the objective of the present invention, the present invention provides a tire, including a body, a tread engaged with the body. The tread includes a plurality of blocks and at least two grooves. The blocks and the at least two grooves are respectively provided along an outer circumferential surface of the tire. Each of the blocks are located between two of the at least two grooves. Each of the blocks has an outer surface bulging outward, wherein the outer surface is a part of the tire that contacts a ground. Each of the blocks has two lateral walls in a transverse direction of the tire. Each of the lateral walls has a flat segment, wherein a surface of each of the flat segments is flat. An extension line is defined along the surface of each of the flat segments in a vertical cross section of each of the blocks, wherein the extension line extends from a bottom of the belonged block toward the outer surface, and a first point is defined at where the extension line leaves the relevant surface. Each extension line has no contact with the belonged block after passing the first point. A first horizontal reference line is defined by connecting the two first points of each of the blocks. A second horizontal reference line and a vertical reference line are defined on the outer surface of each of the blocks, wherein the second horizontal reference line is parallel to the first horizontal reference line, and two ends of the second horizontal reference line contact the relevant outer surface at two second points. A length of the second horizontal reference line is 0.85 times a length of the first horizontal reference line. The vertical reference line is perpendicular both to the first horizontal reference line and the second horizontal reference line, passing through a center of the first horizontal reference line and a center of the second horizontal reference line, wherein a vertical distance is defined between the center of the second horizontal reference line and an intersection of the vertical reference line and the outer surface. The vertical distance is between 0.2 mm and 0.8 mm.

With the outward bulging blocks having the vertical distance of 0.2-0.8 mm, the tire could still maintain good contact with the ground even if the outer surfaces of the blocks are worn. Therefore, the tire could provide good drainage performance and adequate grip. Furthermore, such design could extend the service life of the tire, and enhance security while using the tire.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 3:
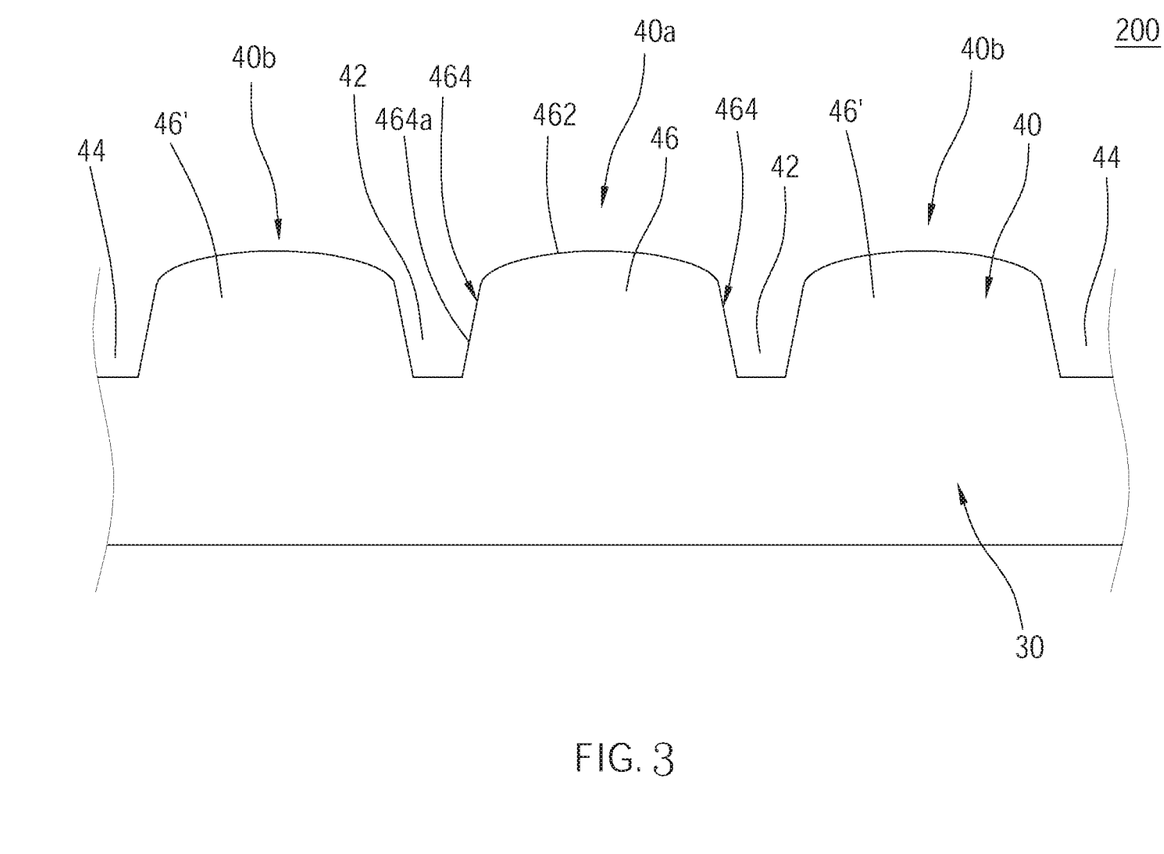
FIG. 3 is a schematic diagram, showing part of the tire of a first embodiment of the present invention.
Figure 4:
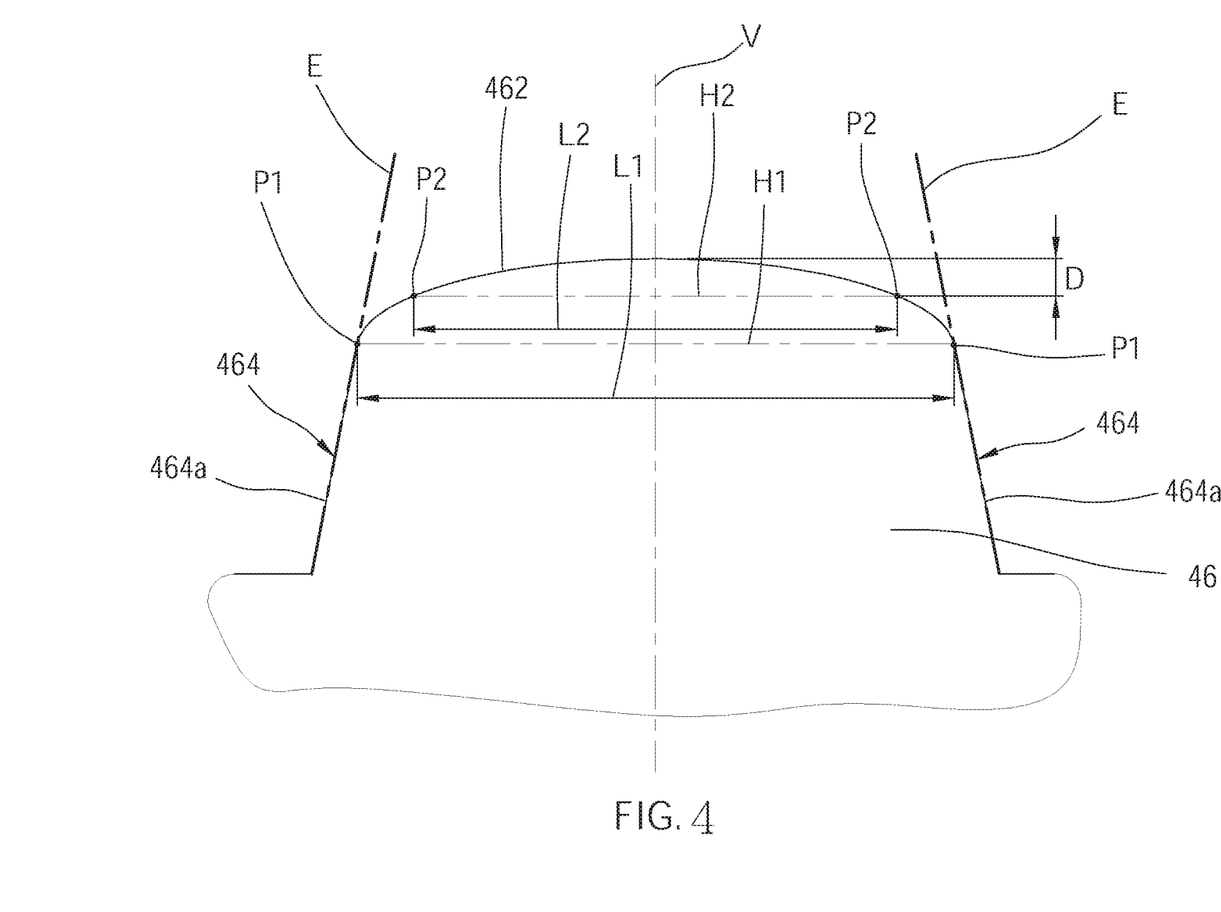
FIG. 4 is a schematic diagram, showing the first blocks of the tire of the first embodiment.

A tire 200 of a first embodiment of the present invention is illustrated in FIG. 3 and FIG. 4, showing a part of the tire 200, wherein the tire 200 includes a body 30 and a tread 40 engaged with outer sides of the body 30. The essence of the present invention is on a structure of the tread 40.

The tread 40 includes a plurality of blocks and at least two grooves. The blocks and the at least two grooves are respectively provided along an outer circumferential surface of the tire 200, wherein each of the blocks is located between two of the at least two grooves, and the blocks form at least one full circle of blocks. More specifically, the at least two grooves include at least four grooves, including two first grooves 42 and two second grooves 44. The tread 40 includes a middle portion 40a and two lateral portions 40b located on two lateral sides of the middle portion 40a, wherein the middle portion 40a is located between the first grooves 42, and each of the lateral portions 40b is located between one of the first grooves 42 and one of the second grooves 44. The blocks include a plurality of first blocks 46 and a plurality of second blocks 46', wherein the first blocks 46 are located on the middle portion 40a, and are arranged along the outer circumferential surface of the tire 200 in a full circle, while the second blocks 46' are respectively located on the lateral portions 40b, and the second blocks 46' on each of the lateral portions 40b are arranged along the outer circumferential surface of the tire 200 to respectively arranged in a full circle. In practice, the middle portion 40a could have two circles of the first blocks 46 arranged thereon, with a central groove formed between said two circles of the first blocks 46.

In order to illustrate easily, we take one of the first blocks 46 for explanation herein. A structure of said block 46 shown in FIG. 4 is in the condition when the tire 200 is unfilled.

The first block 46 has an outer surface 462 bulging outward, wherein the outer surface 462 is the part of the tire 200 that contacts the road surface. In the first embodiment, the outer surface 462 is a curved surface. The first block 46 has two lateral walls 464 in a transverse direction (i.e., a width direction) of the tire 200. Each of the lateral walls 464 has a flat segment 464a, wherein a surface of each of the flat segment 464a is flat, and each of the flat segments 464a is the longest segment of the belonged lateral wall 464. In a vertical cross section of the first block 46, an extension line E is defined along the surface of each of the flat segments 464a, extending from a bottom of the first block 46 toward the outer surface 462, wherein the point where the extension line E leaves the physical surface is defined as a first point P1. Each extension line E has no contact with the first block 46 after passing the first point P1. In other words, for each of the flat segments 464a, the first point P1 thereon is the closest point to the outer surface 462. By lining two first points P1 on the flat segments 464a, a first horizontal reference line H1 could be determined.

In order to define a degree of bulging of the outer surface 462 more accurately, a second horizontal reference line H2 and a vertical reference line V are further defined on the outer surface 462. The second horizontal reference line H2 is parallel to the first horizontal reference line H1, with two ends thereof respectively contacting the outer surface 462 at two second points P2 in the vertical cross section of the first block 46. A length of the second horizontal reference line H2 is 0.85 times a length of the first horizontal reference line H1. The vertical reference line V is perpendicular both to the first horizontal reference line H1 and the second horizontal reference line H2, passing through a center of the first horizontal reference line H1 and a center of the second horizontal reference line H2. The vertical reference line V is parallel to a radial direction of the tire 200. Whereby, a vertical distance D between a point of intersection of the vertical reference line V and the outer surface 462 and the center of the second horizontal reference line H2 could be defined. In the first embodiment, the first block 46 is symmetrical, which are centered on the vertical reference line V. However, this is not a limitation of the present invention. In other embodiments, the first blocks 46 could be also non-symmetrical on two sides of the vertical reference line V.

In the first embodiment, each of the second blocks 46' has the same structure with said first block 46. Thus we are not going to describe it in details herein. By experiments, the vertical distance D of the first block 46 (and each of the second blocks 46') is found optimal when between 0.2 mm and 0.8 mm, for the tire 200 could offer good drainage performance and adequate grip.

Figure 5:
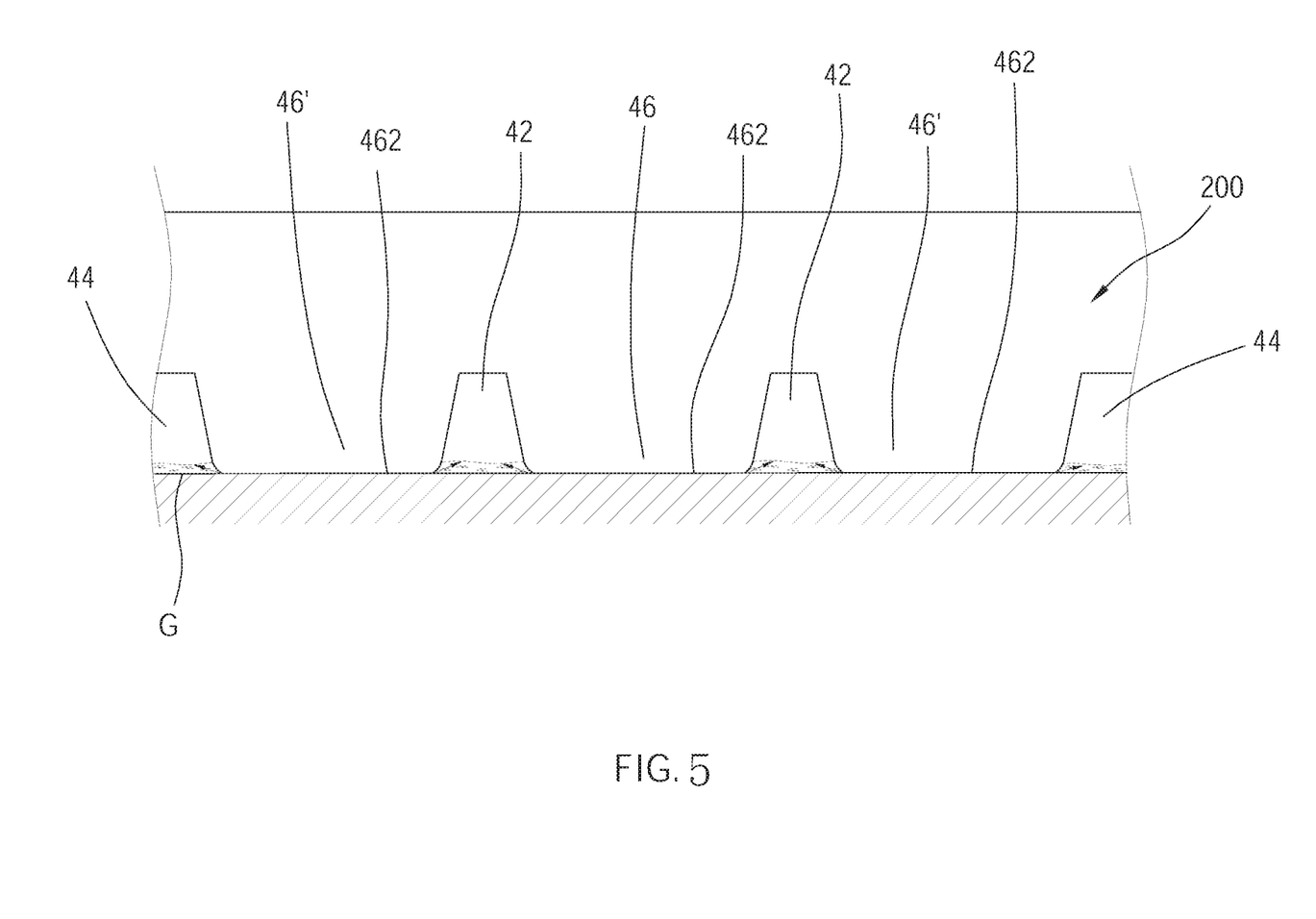
FIG. 5 is a schematic diagram, showing the situation that the tire of the first embodiment rolls on the wet ground when it gets worn.

The tire 200 shown in FIG. 5 is filled and rolling on a ground G, wherein the outer surfaces 462 of the first blocks 46 and the second blocks 46' could still maintain good contact with the ground G even if the outer surfaces 462 bulging from the first blocks 46 and the second blocks 46' are becoming flat due to wear and tear. Whereby, when the tire 200 rolls on the wet ground G, the water of the ground G could be squeeze in the first grooves 42 and the second grooves 44 through the outer surface 462 of each of the first blocks 46 and each of the second blocks 46', whereby to provide good drainage performance.

In addition, due to the maximum vertical distance D is 0.8 mm, even when the tire 200 is loaded, and the first blocks 46 and the second blocks 46's are therefore under pressure, each of the first blocks 46 and each of the second blocks 46' could still maintain good contact with the ground G, whereby to offer good grip. Furthermore, in consideration of the endurance of the tire 200, the vertical distance D would be preferred to be greater than or equal to 0.2 mm. Therefore, preferably, a numerical range of the vertical distance D would be between 0.2 mm and 0.8 mm.

Said vertical distance D of each of the first blocks 46 is equal to the vertical distance D of each of the second blocks 46'. In practice, the vertical distance D of each of the first blocks 46 could be greater than that of each of the second blocks 46', since the middle portion 40a of the tread 40 would be worn more easily than the lateral portions 40b. Therefore, by further bulging the outer surface 462 of each of the first blocks 46 on the middle portion 40a to a greater degree than that of the outer surface 462 of each of the second blocks 46' on the lateral portions 40b, a service life of the tire 200 could be extended. Preferably, the vertical distance D of each of the first blocks 46 located on the middle portion 40a would be between 0.5 mm and 0.8 mm, and the vertical distance D of each of the second blocks 46' located on each of the lateral portions 40b would be smaller than 0.5 mm, but greater than or equal to 0.2 mm.

Figure 6:
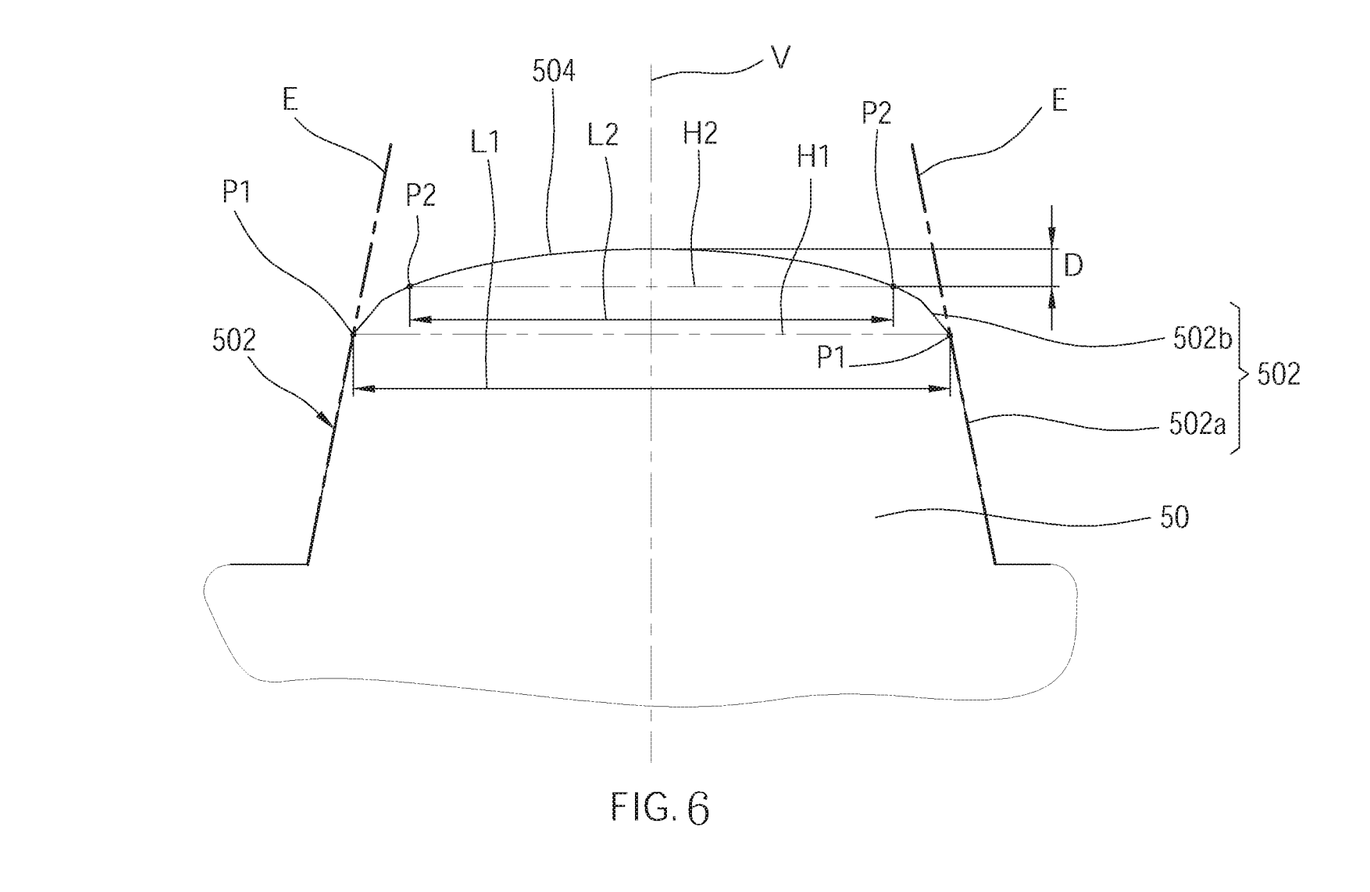
FIG. 6 is a schematic diagram, showing the blocks of a second embodiment of the present invention.

Blocks 50 of a tire of a second embodiment of the present invention is illustrated in FIG. 6, each of which has almost the same structure as described in the first embodiment, wherein the difference between the first and the second embodiments is that, each lateral wall 502 of each of the blocks 50 has a flat segment 502a and a chamfered segment 502b, wherein the chamfered segment 502b is located between the flat segment 502a and an outer surface 504. Each flat segment 502a is the longest segment on each of the lateral walls 502. In the second embodiment, the first point P1 where the extension line E leaves each of the flat segments 502a is located at the junction between the relevant flat segment 502a and the adjacent chamfered segment 502b. The definitions of the first horizontal reference line H1, the second horizontal reference line H2, the second points P2, the vertical reference line V, and the vertical distance D are all the same as described in the first embodiment, which we are not going to discuss in more details herein.

In conclusion, with the outward bulging blocks having the vertical distance of 0.2-0.8 mm, the outer surfaces of the blocks of the tire could maintain good contact with the ground to provide good drainage performance and adequate grip. Furthermore, such design could extend the service life of the tire, and enhance high security while using the tire.

It must be pointed out that the embodiments described above are only some preferred embodiments of the present invention. All equivalent structures which employ the concepts disclosed in this specification and the appended claims should fall within the scope of the present invention.

What is claimed is:

1. A tire, comprising:
    a body;
    a tread engaged with the body, wherein the tread comprises a plurality of blocks and at least two grooves; the blocks and the at least two grooves are respectively provided along an outer circumferential surface of the tire; each of the blocks are located between two of the at least two grooves; each of the blocks has an outer surface bulging outward; the outer surface is a part of the tire that contacts a ground; each of the blocks has two lateral walls in a transverse direction of the tire; each of the lateral walls has a flat segment, wherein a surface of each of the flat segments is flat; an extension line is defined along the surface of each of the flat segments in a vertical cross section of each of the blocks, wherein the extension line extends from a bottom of the belonged block toward the outer surface, and a first point is defined at where the extension line leaves the relevant surface; each extension line has no contact with the belonged block after passing the first point; a first horizontal reference line is defined by connecting the two first points of each of the blocks; a second horizontal reference line and a vertical reference line are defined on the outer surface of each of the blocks, wherein the second horizontal reference line is parallel to the first horizontal reference line, and two ends of the second horizontal reference line contact the relevant outer surface at two second points; a length of the second horizontal reference line is 0.85 times a length of the first horizontal reference line; the vertical reference line is perpendicular both to the first horizontal reference line and the second horizontal reference line, passing through a center of the first horizontal reference line and a center of the second horizontal reference line;

wherein, a vertical distance is defined between the center of the second horizontal reference line and an intersection of the vertical reference line and the outer surface;

wherein the at least two grooves comprise at least four grooves, including two first grooves and two second grooves; the tread comprises a middle portion and two lateral portions located on two lateral sides of the middle portion; the middle portion is located between the first grooves, and each of the lateral portions is located between one of the first grooves and one of the second grooves; the blocks comprise a plurality of first blocks and a plurality of second blocks, wherein the first blocks are located on the middle portion, while the second blocks are respectively located on the lateral portions; the vertical distance of each of the first blocks is greater than the vertical distance of each of the second blocks;

wherein the vertical distance of each of the first blocks is between 0.5 mm and 0.8 mm, and the vertical distance of each of the second blocks is smaller than 0.25 mm and is greater than or equal to 0.2 mm.

2. The tire of claim 1, wherein the outer surface of each of the blocks is curved.

3. The tire of claim 1, wherein each of the blocks is symmetrical on two sides of the vertical reference line.

4. The tire of claim 1, wherein the vertical reference line is parallel to a radial direction of the tire.

* * * * *